United States Patent Office 3,636,056
Patented Jan. 18, 1972

3,636,056
2,6-DISUBSTITUTED-9-OXABICYCLONONANES AND METHODS OF PREPARING SAME
John M. Larkin, Wappingers Falls, N.Y., assignor to Texaco Inc., New York, N.Y.
No Drawing. Filed Oct. 20, 1969, Ser. No. 867,946
Int. Cl. C07d 7/18
U.S. Cl. 260—345.1                        14 Claims

ABSTRACT OF THE DISCLOSURE

There is provided 2,6-disubstituted-9-oxabicyclononanes of the formula:

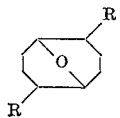

where R is $NO_2$, $=O$ or $NH_2$ and where $R^1$ is $ONO_2$ or OH. The compounds have utility as rust inhibitors, cetane improvers and anti-icing compounds in fuel compositions.

---

This invention relates to new compositions of matter and to a method for preparing the same. More particularly, this invention relates to 2,6-disubstituted-9-oxabicyclononanes of the following formula:

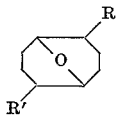

where R is $NO_2$, $=O$ or $NH_2$ and where $R^1$ is $ONO_2$ or OH. The compounds contemplated herein include 2-nitro-6-nitrato-9-oxabicyclo[3.3.1]nonane,
6-nitrato-9-oxabicyclo[3.3.1]nonan-2-one,
6-hydroxy-9-oxabicyclo[3.3.1]nonan-2-one,
2-amino-6-hydroxy-9-oxabicyclo[3.3.1]nonane,
2-nitro-6-hydroxy-9-oxabicyclo[3.3.1]nonane and
2-amino-6-nitrato-9-oxabicyclo[3.3.1]nonane.

The substituted oxabicyclononanes contemplated herein are prepared by contacting 1,5-cyclooctadiene represented by the formula:

with dinitrogen tetroxide and oxygen at a temperature between —20 and 30° C., preferably at temperatures between —5 and 10° C., to form 2-nitro-6-nitrato-9-oxabicyclo[3.3.1]nonane. In conducting this reaction, I employ from 1 to 2 moles of dinitrogen tetroxide and from 1 to 30 moles of oxygen per mole of 1,5-cyclooctadiene. Preferably, 3 to 20 moles of oxygen and 1 to 1.2 moles of dinitrogen tetroxide are employed per mole of diene. Air or an oxygen containing gas can be employed as the source of oxygen or oxygen can be provided in admixture with inert gases such as nitrogen, carbon dioxide or argon. Under preferred conditions, oxygen and dinitrogen tetroxide are respectively introduced into a reaction zone containing the diene at a rate between 2 and 80 milliliters/minute/gram diene and between about 0.1 and 10 gram/hour/gram of diene. Atmospheric and higher pressures may be employed and the reaction is conveniently conducted in the presence of inert organic solvents having from 1 to 18 carbon atoms exemplified by hydrocarbons including paraffins having from 5 to 18 carbon atoms such as pentane, hexane, octane, 2,2,4-trimethylpentane, decane, dodecane and octadecane; cycloparaffins such as cyclohexane, cyclopentane and cyclooctane; halogenated paraffins such as carbon tetrachloride and methylene chloride; aromatics such as benzene and toluene; and halogenated aromatic hydrocarbons such as chlorobenzene, o-dichlorobenzene and ortho, meta or parachlorotoluene. In general, reaction times of about one-half to 8 hours are employed, the time related to the reaction temperature selected and the ratio of oxygen to dinitrogen tetroxide. Where high ratios of oxygen to dinitrogen tetroxide are employed, the rate of reaction increases thereby diminishing total reaction times. Higher temperatures similarly decrease reaction times.

It is to be noted that the dinitrogen tetroxide employed is actually an equilibrium mixture of dinitrogen tetroxide and nitrogen dioxide with the equilibrium being driven to essentially 100 percent dinitrogen tetroxide at 0° C. and essentially 100 percent nitrogen dioxide at 140° C. at one atmosphere pressure.

Other 2,6-disubstituted-9-oxabicyclononanes are prepared by further reacting 2-nitro-6-nitrato-9-oxabicyclo[3.3.1]nonane as follows.

6-nitrato-9-oxabicyclo[3.3.1]nonan-2-one is prepared by contacting the aforementioned nitronitrate compound with a stoichiometric amount of a base at a temperature between about 0 and 80° C. Higher amounts of base may be employed for example up to 5 moles of base, however, the reaction is successfully accomplished by employing one mole of base per mole of nitronitrate compound. Among the aplicable bases, I prefer alkali metal hydroxides such as sodium hydroxide, potassium hydroxide, lithium hydroxide but alkaline earth hydroxides such as magnesium hydroxide, calcium hydroxide and barium hydroxide may also be employed. Water in an amount ranging from 1 to 25 moles per mole of nitro-nitrate along with a solvent characterized by its miscibility with the nitronitrate, base and water are employed. Miscible solvents include $C_1$ to $C_4$ alcohols, cyclic ethers such as tetrahydrofuran, dimethylformamide, dimethylsulfoxide, ethylene glycol, dioxane, trioxane and ethyl acetate. Sufficient solvent is employed to provide miscibility between the reaction components and generally amounts of 1:5 to 5:1, preferably from 1:1 to 2:1, by weight of solvent to water are employed. The reaction proceeds for a period of from about one-half minute to several hours. Subsequently the reaction system is rapidly contacted at a temperature of from about 0 to 75° C. with one equivalent of acid per equivalent of base employed. Rapid contacting is intended to mean that acid addition is completed within a short period of a few minutes and preferably within at least one minute. In the course of acid introduction at least one mole of water per mole of nitronitrate compound, preferably 2 to 10 moles of water, are employed during the acid addition stage. Preferred acids include mineral acids such as hydrochloric acid, phosphoric acid, sulfuric acid and nitric acid but I may also employ carboxylic acids such as trifluoroacetic acid, perfluoropropionic acid, perfluorobutyric acid, or such other materials as benzenesulfonic acid or paratoluenesulfonic acid.

6-hydroxy-9-oxabicyclo[3.3.1]nonan-2-one is prepared by contacting the aforementioned nitronitrate with at least 2 moles to about 10 moles of base as mentioned above and preferably alkali metal hydroxides at a temperature of from about 75 to 100° C. During the contacting water is present in an amount of at least one mole and up to 15 moles per mole of 2-nitro-6-nitrato-9-oxabicyclo[3.3.1] nonane and a solvent characterized by its miscibility with water, base and nitronitrate is employed to facilitate the reaction as previously set forth above. Reaction times customarily range from about 2 to 24 hours at the temperature conditions provided above. Temperatures exceeding 100° C. may be employed under superatmospheric pressures. The reactants are thereafter contacted with at least one equivalent of acid per equivalent of base previously employed where the contacting is undertaken at a temperature of from about 0 to 75° C.

2 - amino-6-hydroxy-9-oxabicyclo[3.3.1]nonane is prepared by contacting 2-nitro-5-nitrato-9-oxa[3.3.1]nonane with at least 3 and up to 40 moles of hydrogen in the presence of a hydrogenation catalyst at temperatures of from room temperature to 150° C., preferably from 40 to 100° C., for periods ranging from one-half to 10 hours. By way of illustration hydrogenation catalysts such as nickel, cobalt, iron and rhenium metals or compounds thereof, supported or unsupported, and with or without promoters are contemplated herein. Preferably, I employ platinum metals catalysts including the light platinum group comprising ruthenium, rhodium and palladium and the heavy platinum group comprising osmium, iridium and platinum. The catalyst may be employed as the respective metal, oxide or salt such as platinum dichloride, palladium dichloride, rhodium oxide, rhodium trichloride, ruthenium trichloride, iridium dichloride, osmium tetrachloride, platinum and palladium. A solvent of the type previously mentioned above can be present during hydrogenation. A continuous process may be employed by feeding or percolating the nitronitrate through a hydrogenation catalyst bed and conducting the reaction under hydrogen pressures of 2 to 40 atmospheres.

2 - nitro - 6 - hydroxy-9-oxabicyclo[3.3.1]nonane is prepared by contacting the nitronitrate with from 2 to 10 moles of base at a temperature of 75 to 100° C. for a period of from 2 to 24 hours in the presence of at least one mole and up to fifteen moles of water per mole of nitronitrate. Subsequently, there is slowly introduced to the reaction mixture over a time period exceeding ten minutes at least one equivalent of acid per equivalent of base previously employed. Among the contemplated acids there is included carboxylic acids such as acetic acid, propionic acid, butyric acid and benzoic acid, phenol, carbonic acid, ammonium chloride and paratoluenesulfonic acid. Preferably, I employ a mineral acid such as hydrochloric acid, phosphoric acid, sulfuric acid and nitric acid. The mineral acids are best employed as aqueous solutions where the concentration of acid is not greater than 50 volume percent.

2 - amino - 6 - nitrato-9-oxabicyclo[3.3.1]nonane is prepared by contacting 2-amino-6-hydroxy-9-oxabicyclo [3.3.1]nonane with concentrated nitric acid and an acid anhydride such as acetic anhydride, propionic anhydride and phthalic anhydride at temperattures of from —40 to 50° C., preferably from —25 and 25° C. At least 2 moles and as much as 10 moles of acid anhydride per mole of concentrated nitric acid and at least one mole to 10 moles of acid per mole of aminoalcohol are employed. The reaction may be conducted in the presence of a non-aqueous solvent such as diethylether, tetrahydrofuran or dioxane for periods of 1 to 60 minutes.

In order to more fully illustrate the nature of this invention and manner of practicing the same the following examples are presented.

EXAMPLE I

A solution of 4.32 grams of 1,5-cyclooctadiene in 75 mls. of carbon tetrachloride was maintained at 0 to 5° C. 3.1 mls. of liquid nitrogen dioxide was vaporized and introduced into the solution along with 65 mls./min. of oxygen. Oxygen flow was continued at the rate of 65 mls./min. for a period of about three hours. Carbon tetrachloride was subsequently removed at 0° C. and 1–5 mm. pressure. A white solid weighing 9.08 grams remained as a residue and was recrystalized from carbon tetrachloride. The recovered product had a melting point of 90 to 92° C. and was identified by elemental analysis, infra-red and nuclear magnetic resonance as 2-nitro-6-nitrato-9-oxabicyclo[3.3.1]nonane.

EXAMPLE II

To a solution of 2 grams of 2-nitro-6-nitrato-9-oxabicyclo[3.3.1]nonane in 50 mls. of methanol at 25° C., there was added 20 mls. of 10 percent aqueous potassium hydroxide. 10 mls. of concentrated hydrochloric acid was thereafter rapidly introduced to the solution. The solution was allowed to stand for several hours and the solvent was removed under vacuum at a temperature of 40° C. 1:58 grams of product was recovered by recrystallization from aqueous ethanol. A white crystalline solid having a melting point of 101 to 102° C. was identified as 6-nitrato-9-oxabicyclo[3.3.1]nonan-2-one.

EXAMPLE III

A solution consisting of three grams of 2-nitro-6-nitrato-9-oxabicyclo[3.3.1]nonane, 50 mls. of methanol and 30 mls. of aqueous potassium hydroxide was heated at a temperature of 78° C. for 17 hours. The solution was thereafter cooled to about 20° C. in an ice bath and 30 mls. of concentrated hydrochloric acid was rapidly added to the solution. One-third of the methanol was removed by vacuum evaporation at 45° C. and 200 mls. of ice water added. After one hour an insoluble black precipitate was filtered from the solution. The aqueous portion of the reaction medium was washed with 200 mls. of diethylether and the solvent allowed to evaporate. The solids were chromatographed on silica gel and eluted with methylene chloride and diethylether. A liquid identified as 6-hydroxy-9-oxabicyclo[3.3.1]nonan-2-one was recovered after evaporation of the solvent from the eluants.

EXAMPLE IV

A mixture consisting of 8 grams of 2-nitro-6-nitrato-9-oxabicyclo[3.3.1]nonane and 175 mls. of ethyl acetate was contacted with 1.5 grams of a hydrogenation catalyst, 10 percent palladium dichloride on carbon, in a pressure reactor maintained at a hydrogen pressure of 500 p.s.i.g. The reactor was heated and rocked at 85 to 87° C. for 6 hours and thereafter permitted to cool. The catalyst was removed by filtration and ethyl acetate removed by vacuum evaporation. 3.83 grams of a viscous yellow brown liquid remained as a residue and identified as 2-amino-6-hydroxy-9-oxabicyclo[3.3.1]nonane.

EXAMPLE V

2 - nitrol - 6 - nitrato - 9 - oxabicyclo[3.31]nonane was evaluated as a rust inhibitor as follows.

An accelerated rust test was conducted and consisted of inserting a 3½" x ½" x ⅛" cold rolled steel strip into a 4-ounce glass bottle and filling the bottle with a first test fuel composed of 90 cc. of base fuel identified below and 20 cc. of distilled water. A second steel strip was inserted into another 4-ounce glass bottle and another strip was wetted with a second test fuel consisting of 90 cc. of base fuel, 20 cc. of distilled water and 0.1 percent by weight of 2-nitro-6-nitrato-9-oxabicyclo[3.3.1]nonane in the base fuel. The bottles were shaken for 15 seconds and stored for 24 hours. At the end of this period the strips were insepected and measured visually for the percent of area rusted that had been contacted with the fuel layer.

Base fuel

| | |
|---|---|
| Gravity, ° API | 58.2 |
| TEL, cc./gal. | 3.02 |
| RVP, lbs. | 11.0 |
| Bromine No. | 11.0 |
| Dist. ASTM: | |
| IBP °F. | 84 |
| 5% | 103 |
| 10% | 115 |
| 20% | 142 |
| 30% | 171 |
| 40% | 195 |
| 50% | 213 |
| 60% | 229 |
| 70% | 247 |
| 80% | 270 |
| 90% | 309 |
| 95% | 339 |
| EP | 376 |
| Research Octane No. | 102.7 |
| Motor Octane No. | 93.6 |
| Aromatics | 36.5 |
| Olefins | 7.0 |
| Saturates | 56.5 |

The first strip contacted with base fuel and distilled water resulted in 90 to 95 percent of the surface area in contact with the fuel layer to have rusted within 24 hours. The second test strip contacted with base fuel, distilled water and 2-nitrol-6-nitrato-9-oxabicyclo[3.3.1]nonane showed only 5 percent rusting on the surface area contacted with the test fuel layer thereby demonstrating the compound's activity as a rust inhibitor for fuels.

EXAMPLE VI

2 - nitro - 6 - nitrato-9-oxabicyclo[3.3.1]nonane was evaluated as an anti-icing carburetor compound. An apparatus for measuring anti-icing activity was provided consisting of a 1 inch diameter glass tube measuring about 8 inches in length having at one end means to attach a vacuum and at the other end a steel metal plate angularly inserted within the tube and representing a carburetor throttle plate. Two aperatures were provided ahead of the metal plate permitting respectively the introduction of test fuel and air into the glass tube. By applying vacuum, test fuel and air are drawn past the steel plate. The air prior to being introduced to the glass tube passes through an ice bath and is conditioned to possess 100 percent humidity, that is, ideal for conditions for icing in a carburetor. The temperature of the test fuel and air in the glass tube is consequently lowered by fuel evaporation which in turn tends to freeze water on the metal plate. Means are provided for measuring the pressure between the attached vacuum means and the steel plate. The merit of the compound as an anti-icing additive is determined by an end point corresponding to the time in seconds required to attain a pressure differential of 0.5 inch of mercury. Two test fuels were evaluated, the first consisting of the base fuel identified in Example V and the second test fuel consisting of base fuel containing 0.1 percent by weight of base fuel of 2-nitro-6-nitrato-9-oxabicyclo[3.3.1]nonane. The evaluation resulted in the first test fuel reaching the end point after 25 seconds. The second test fuel attained the end point after 185 seconds thereby demonstrating the utility of the compound as an anti-icing compound.

I claim:

1. As a composition of matter a 2,6-disubstituted-9-oxabicyclononane having the structural formula:

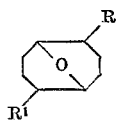

where R is $NO_2$, $=O$ or $NH_2$ and where $R^1$ is $ONO_2$ or OH.

2. A composition according to claim 1 wherein said 2,6 - disubstituted-9-oxabicyclononane is 2-nitro-6-nitrato-9-oxabicyclo[3.3.1]nonane.

3. A composition according to claim 1 wherein said 2,6-disubstituted-9-oxabicyclononane is 6-hydroxy-9-oxabicyclo[3.3.1]nonan-2-one.

4. A composition according to claim 1 wherein said 2,6-disbustituted-9-oxabicyclononane is 6-hydroxy-9-oxabicyclo[3.3.1]nonan-2-one.

5. A composition according to claim 1 wherein said 2,6 - disbustituted - 9-oxabicyclononane is 2-amino-6-hydroxy-9-oxabicyclo]3.3.1]nonane.

6. A composition according to claim 1 wherein said 2,6-disubstituted-9-oxabicyclononane is 2-nitro-6-hydroxy-9-oxabicyclo[3.3.1]nonane.

7. A composition according to claim 1 wherein said 2,6-disubstituted-9-oxabicyclononane is 2-amino-6-nitrato-9-oxabicyclo[3.3.1]nonane.

8. A method of preparing a 2,6-disubstituted-9-oxabicyclononane which comprises:
(a) contacting 1,5-cyclooctadiene at a temperature between —20 and 30° C. with 1 to 2 moles of dinitrogen tetroxide and from 1 to 30 moles of oxygen per mole of said 1,5-cyclooctadiene, and
(b) recovering 2 - nitro - 6-nitrato-9-oxabicyclo[3.3.1] nonane.

9. A method according to claim 8 wherein 1 mole of 1,5-cyclooctadiene is contacted with 3 to 20 moles of oxygen and 1 to 1.2 moles of dinitrogen tetroxide.

10. A method according to claim 8 wherein said product of step (b) is contacted at about 0 to 80° C. with from 1 to 5 moles of base per mole of said product and thereafter rapidly contacted with at least one equivalent of acid per equivalent of said base at a temperature of from about 0 to 75° C. and recovering 6-nitrato-9-oxabicyclo[3.3.1]nonan-2-one.

11. A method according to claim 8 wherein said product of step (b) is contacted at about 75 to 100° C. with 2 to 10 moles of base and 1 to 15 moles of water per mole of said product and thereafter contacted with at least one equivalent of acid per equivalent of said base at a temperature from about 0 to 75° C. and recovering 6-hydroxy-9-oxabicyclo[3.3.1]nonane-2-one.

12. A method according to claim 8 wherein said product of step (b) is contacted at 75 to 100° C. with from 2 to 10 moles of base and 1 to 15 moles of water per mole of said product, thereafter slowly introducing at least one mole of acid per mole of said base and recovering 2-nitro-6-hydroxy-9-oxabicyclo[3.3.1]nonane.

13. A method according to claim 8 wherein said product of step (b) is contacted at room temperature to 150° C. with 3 to 40 moles of hydrogen per mole of said product in the presence of a hydrogenation catalyst and recovering 2 - amino - 6 - hydroxy-9-oxabicyclo[3.3.1] nonane.

14. A method according to claim 13 wherein 1 to 10 moles of concentrated nitric acid per mole of 2-amino-6-hydroxy-9-oxabicyclo[3.3.1]nonane and 2 to 10 moles of acid anhydride per mole of concentrated nitric acid are contacted at a temperature of from —40 to 50° C. and recovering 2-amino-6-nitrato-9-oxabicyclo[3.3.1]nonane.

References Cited

UNITED STATES PATENTS 3,288,812  11/1966  Lafont et al. _____ 260—345.9
3,347,826  10/1967  Frazer _____ 260—345.9 X JOHN M. FORD, Primary Examiner U.S. Cl. X.R.

44—63; 252—70, 396; 260—345.9